United States Patent
Wilson et al.

(10) Patent No.: US 6,752,560 B2
(45) Date of Patent: Jun. 22, 2004

(54) REMOVABLE SPLINED SHAFT END FOR SUBMERSIBLE PUMPS

(75) Inventors: Brown Lyle Wilson, Tulsa, OK (US); Terry W. Shafer, Broken Arrow, OK (US); John Jay Mack, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/173,279

(22) Filed: Jun. 17, 2002

(65) Prior Publication Data

US 2002/0192021 A1 Dec. 19, 2002

Related U.S. Application Data

(60) Provisional application No. 60/299,065, filed on Jun. 18, 2001.

(51) Int. Cl.⁷ .............................. F16C 3/00; F16D 1/06
(52) U.S. Cl. ........................... 403/1; 403/292; 403/293; 403/298; 403/319; 403/341; 403/355; 403/359.6; 403/396; 464/182; 464/184
(58) Field of Search .......................... 464/80, 182, 184; 403/292, 293, 298, 319, 341, 355, 356, 359.6, 375, 396, 16, 1; 416/240, 244 R, 146 R; 417/359, 423.6

(56) References Cited

U.S. PATENT DOCUMENTS

| | | |
|---|---|---|
| 826,944 A | 7/1906 | Krieger |
| 3,702,545 A * | 11/1972 | Schlotmann et al. ......... 464/80 |
| 3,783,591 A * | 1/1974 | Sotak et al. |
| 3,805,374 A | 4/1974 | Carman |
| 3,986,370 A | 10/1976 | Garrison |
| 4,348,132 A | 9/1982 | Mullenberg |
| 4,593,495 A * | 6/1986 | Kawakami et al. |
| 4,615,639 A | 10/1986 | Seireg |
| 4,618,044 A * | 10/1986 | Fujikawa et al. |
| 5,538,355 A | 7/1996 | Burr |
| 6,116,855 A * | 9/2000 | Maki ....................... 416/146 R |
| 6,301,782 B1 * | 10/2001 | Jacks, Jr. |
| 6,394,753 B1 * | 5/2002 | Maki et al. ............. 416/146 R |

FOREIGN PATENT DOCUMENTS

| | | | | |
|---|---|---|---|---|
| AT | OE0213167 | * | 1/1961 | ................... 464/80 |
| FR | 1175600 | * | 3/1959 | ................... 464/80 |
| SU | 0705166 | * | 12/1979 | ................... 464/80 |

* cited by examiner

Primary Examiner—John R. Cottingham
Assistant Examiner—Victor MacArthur
(74) Attorney, Agent, or Firm—Bracewell & Patterson, L.L.P.

(57) ABSTRACT

A submersible pump assembly having first and second components that are coupled together has a removable externally splined sleeve. A key is located in the keyway between the shaft sleeve and the shaft for transmitting torque. A threaded fastener secures to a threaded hole extending inward from an end face of the shaft end coaxial with an axis of the shaft end. The fastener has a head that engages an outward facing shoulder of the shaft sleeve to releasably secure the shaft sleeve to the shaft. A coupling sleeve has internal splines that engage the external splined section of the shaft sleeve. The coupling sleeve is in engagement with a shaft end assembly of the second component for transmitting torque between the shafts of the first and second components. The head that of the fastener transmits axial loads between the shafts of the first and second components.

14 Claims, 2 Drawing Sheets

US 6,752,560 B2

REMOVABLE SPLINED SHAFT END FOR SUBMERSIBLE PUMPS

CROSS-REFERENCE TO RELATED APPLICATION

Applicants claim the benefit of provisional application Ser. No. 60/299,065 filed Jun. 18, 2001.

BACKGROUND OF THE INVENTION

1. Field of the Invention

The present invention relates generally to electric submersible pump connections. More specifically, the present invention relates to a splined connection for connecting submersible pumps that is removable.

2. Description of the Related Art

It is sometimes advantageous to couple multiple pumps to one motor in an electric submersible pump system. To do so shafts must pass from the motor through one pump to the next and continue to any successive pumps. Therefore, in a two pump system the lower pump drive shaft is connected to the motor at one end, extends through the lower pump and is connected to the second pump at the other end. These pump assemblies can be quite long, with a length to diameter ration greater than 250 being not uncommon.

In order to transmit the high torque between the motor and the pumps, a relatively large diameter coupling is preferred. Such couplings are typically a splined connection wherein each of the ends have matching splines. Normally in a one or two pump assembly, the shaft has a constant diameter, and the grooves for the splines are cut into the shaft at each end. A coupling sleeve having internal splines slides over the upper end of a lower shaft and the lower end of an upper shaft.

Where the second pump connects to the first, less torque is being transmitted (approximately half as much) so conventionally-sized splined ends may be used. Having the shaft ends at the same diameter as the shaft allows the pump components to be assembled and disassembled over the splined ends. The pumps are typically assembled by sliding impellers and diffusers over one end of the pump shaft, each impeller and diffuser having a central bore that closely receives the shaft.

A disadvantage of having the splined ends at the same diameter as the shaft is that the splines form a weak point in the shaft because the shaft has less cross-sectional area at the splined ends due to the splines. The amount of torque that a conventional splined end can handle is significantly less than if the splined end had the same cross-sectional area as the remaining portions of the shaft. The ability to transmit torque is related to the cube of the diameter, so that small decreases in the diameter of splined ends due to the spline grooves mean that the shaft can transmit much less torque. This is typically not a problem in two pump systems because the torque being transmitted from the first pump to the second is about half the torque being transmitted from the motor to the first pump.

For three or more pump systems, one approach is to utilize larger diameter shafts in the motor and each of the pumps. A larger shaft is not a particular disadvantage for the motor. However, larger shafts for the pumps results in less radial distance between the inner and outer portions of the flow channels of the impellers and diffusers, unless the housings are also made larger. It may not be possible to increase the diameters of the housings. Consequently, the pumps with larger shafts may not be as efficient as pumps with smaller diameter shafts.

Another approach is to provide an enlarged end on the lower end of the shaft of the lower pump so that it has the same strength as the remaining portion of the shaft. One prior art technique involves welding or brazing a shaft sleeve, also called a knob spline, onto the end of the shaft. One of the problems with this approach is that the process is very sensitive and the welding requires skilled welders and machinists. Also, this technique results in a permanently enlarged end. However, having a permanently enlarged end does not create a problem if it is only on one end of the shaft because the impellers and diffusers could be assembled over the other end of the shaft.

When more than two pumps are used the torque passed from the first pump to the second pump increases. For example, when five pumps are used the torque being transmitted from the first pump to the second pump is approximately 80% of the torque being transmitted from the motor to the first pump. Because of this, a conventional splined end connection may not be an option between the first and second pump. Both ends of the shaft of the first pump can't be permanently enlarged because the impellers and diffusers will not slide over a permanently enlarged end. This either limits design flexibility or requires a work around.

SUMMARY OF THE INVENTION

A shaft sleeve is attached to a downhole pump drive shaft with a high strength key to transmit high torque loads from one pump to another. Because the shaft sleeve is attached with a key, it is easily removable. The shaft sleeve has exterior splines and effectively increases the diameter of the connection so that larger loads may be transmitted. The shaft sleeve and key can each be manufactured from a variety of high strength materials to deliver the most cost effective coupling for the application.

The shaft sleeve is secured to the shaft end by a threaded section. Preferably, the threaded section is a threaded hole formed in the end face of the shaft end. A fastener with a head secures to the threaded hole. The head of the fastener engages a shoulder on the shaft sleeve to secure it to the shaft end against axial movement. Preferably, a shaft sleeve is mounted to both ends of the shaft of the first pump and to the lower end of the shaft of the second pump. A splined coupling sleeve slides over the shaft sleeves of the mating shaft ends, engaging the external splines to transmit torque from the shaft of the first pump to the shaft of the second pump. The shaft end assembly of the second pump transfers axial down thrust through the head of the fastener to the shaft of the first pump.

DESCRIPTION OF THE PREFERRED EMBODIMENT

Figure 1:
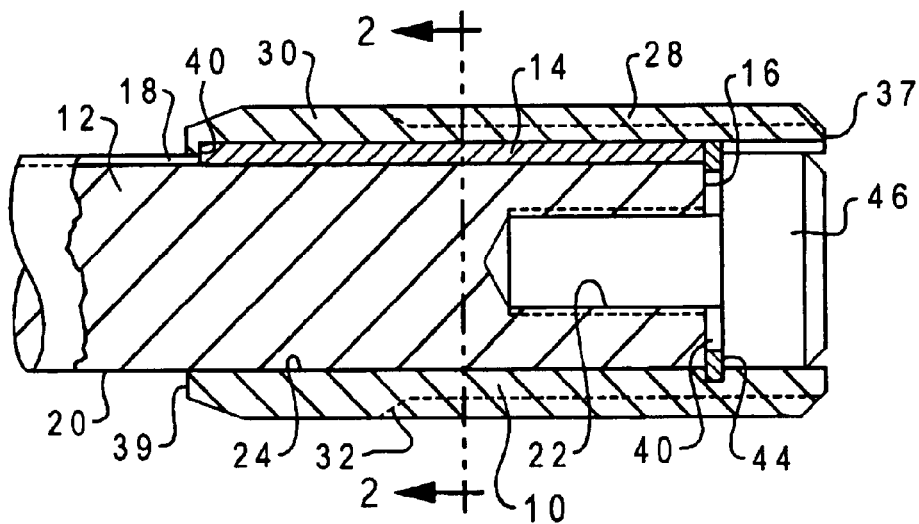
FIG. 1 is a sectional view of a shaft sleeve and shaft end constructed in accordance with this invention.
Figure 3:
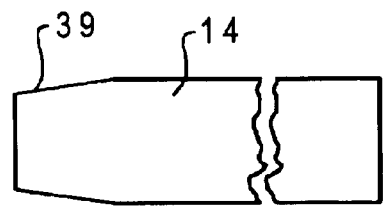
FIG. 3 is an enlarged plan view of a portion of the key of the shaft end of FIG. 1.

As shown in FIG. 1, a shaft sleeve 10 is connected to a shaft 12 with a key 14 to transmit high torque loads from one shaft 12 to another. A key 14 between shaft sleeve 10 and shaft 12 secures shaft sleeve 10 with shaft end 12 for rotation therewith.

Shaft 12 is preferably formed of hard, corrosion resistant materials such as K500 Monel, or Inconel X-750. Other materials may also be suitable depending on the application. Shaft 12 is generally cylindrical with two ends. Shaft sleeve 10 generally attaches to one end of shaft 12, although it could be attached to both ends, if desired. Shaft 12 has an end face 16 and a shaft keyway slot 18 machined into its outer diameter 20 from end face 16 a selected distance. In the preferred embodiment, a threaded hole 22 is machined into end face 16 coaxial with the axis of shaft 12.

Figure 2:
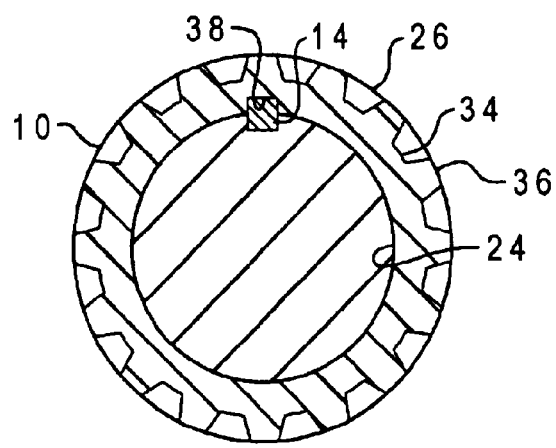
FIG. 2 is a cross sectional view of the shaft sleeve of FIG. 1 taken along line 2—2 of FIG. 1.

Shaft sleeve 10 is an annular member with a bore 24 and an exterior 26. Shaft sleeve has three general sections along its length. At end 37, shaft sleeve 10 has external splines 28 on its exterior 26, while at the opposite end 39, exterior 26 of shaft sleeve 10 has a cylindrical full outer diameter section 30. Between splines 28 and full diameter section 30 is a spline transition 32, wherein splines 28 terminate. Splines 28 are machined into exterior 26 to create spline recesses 34 and spline teeth 36 as is more clearly seen in FIG. 2. In the preferred embodiment splines 28 extend from end 37 of shaft sleeve 10 to the spline transition 32. Spline recesses 30 become shallower in spline transition 32 such that full diameter section 30 is relatively smooth. The total length of shaft sleeve 10 is substantially larger than the length of splines 28. In the preferred embodiment, the length of splines 28 is about 50 to 70% of the length of shaft sleeve 10. In the preferred embodiment full diameter section 30 transmits a majority of the torque from shaft 12 to shaft sleeve 10, while splines 28 transmit torque from shaft sleeve 10 to an adjacent shaft (not shown in FIG. 1). By spreading these torque loads between the two sections, stress concentrations are reduced.

A keyway slot 38 is machined into inner diameter 24 and runs the length of the shaft sleeve 10 in the preferred embodiment. Keyway slot 38 is approximately the same size as shaft keyway slot 18 so that when aligned, they form a keyway receptacle for key 14. Key 14 runs the majority of the length of shaft sleeve 10, extending from shaft end face 16 to the end of shaft sleeve 10. A protuberance 40 is located in shaft sleeve keyway slot 38 at end 39 of shaft sleeve to retain key 14. Key 14 has a tapered section 39 at its end farthest from shaft end face 16 that is slightly tapered in width to prevent stress concentrations. The length of the tapered section 39 is much shorter than the length of key 14. Keyway slots 18, 38 remain constant in width through their lengths, resulting in a tapered clearance adjacent shaft end face 16. For interchangeability, both the leading and trailing edges of key 14 are tapered in tapered section 39. However, only the taper on the trailing edge reduces stress concentrations. Also, both ends of key 14 could have a tapered section 39, if desired for interchangeability. Alternately, the tapered clearance could be achieved by tapering keyway slots 18, 38 and making key 14 of constant width.

In the preferred embodiment, an annular retaining groove 40 is also machined into inner diameter 24 and runs the full circumference of inner diameter 24 near end 37 of shaft sleeve 10. A retaining ring 44 snaps into retaining groove 40 and abuts end face 16 of shaft 12. A threaded fastener 46 engages a threaded receptacle 22 to secure shaft sleeve 10 against axial loads. Fastener 46 has a head 48 that engages retaining ring 44, which serves as a shoulder of shaft sleeve 10 to hold shaft sleeve 10 on shaft 12. Head 48 preferably has an outer diameter that is cylindrical and only slightly smaller than bore 24 of shaft sleeve 10. Head 48 is spaced slightly from shaft end face 16 by the width of retaining ring 44. The outer end of head 48 is substantially flush with end 37 of shaft sleeve 10, and preferably protrudes past slightly.

The combination of retaining ring 44 and retaining bolt 46 is the preferred approach because of the inherent redundancy of such a system. Because axial loads do not compare in magnitude to the rotational loads on the shaft sleeve 10, the axial retention system may be easily changed without degrading the performance of the invention. For example, a set screw could be inserted laterally through a hole in shaft sleeve 10 into engagement with shaft 12. Alternately, internal threads could be formed in shaft sleeve 10 for engaging external threads on shaft 12 for preventing axial movement of shaft sleeve 10. The threads in such instance need not be tightened because torque would be transmitted through key 14.

Bore 24 of shaft sleeve 10 is very close to outer diameter 20 of shaft 12. The preferred embodiment has outer diameter 20 of $11/16$ in, or 0.6875". Inner diameter 24 of the preferred embodiment is no more that 0.003" larger, or 0.6878". The difference between the inner diameter of bore 24 and outer diameter 20 is known as the diametrical clearance. When the diametrical clearance in the preferred embodiment is over approximately 0.005", key 14 (approximately $1/16$ in. square or 0.0625") will tend to roll and the coupling may fail. Therefore, machining tolerances are critical to the success of the present invention.

Figure 4:
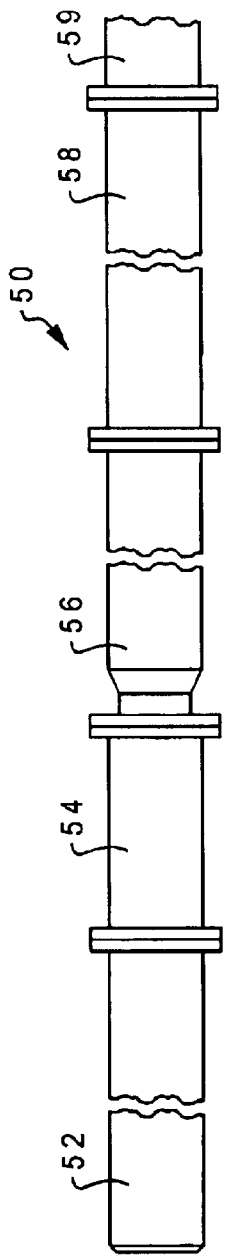
FIG. 4 is a schematic elevational view illustrating a submersible pump assembly having at least one shaft connection in accordance with this invention.

FIG. 4 illustrates an application for the coupling described. Submersible pump assembly 50 has a number of modules or components. These include an electrical motor 52 that is secured to a seal section 54. Seal section 54 equalizes pressure of lubricant in motor 52 with that of the downhole environment. A first pump 56 is mounted to the upper end of seal section 54. A second pump 58 is mounted to the upper end of first pump 56. A third pump 59 is mounted to the upper end of second pump 58. There may be more pumps, or third pump 59 may be connected to a string of production tubing through which the produced well fluid flows. Each pump 56, 58, and 59 is a centrifugal pump with a driven shaft that rotates impellers (not shown) within diffusers. Pump 56 has the sole intake to the well fluid and discharges into second pump 58. Second pump 58 discharges into third pump 59. First pump 56 has to be able to handle the necessary torque to rotate both of the upper pumps 58, 59. Consequently, both ends of the shaft of first pump 56 are preferably enlarged in diameter over the shaft diameter.

Figure 5:
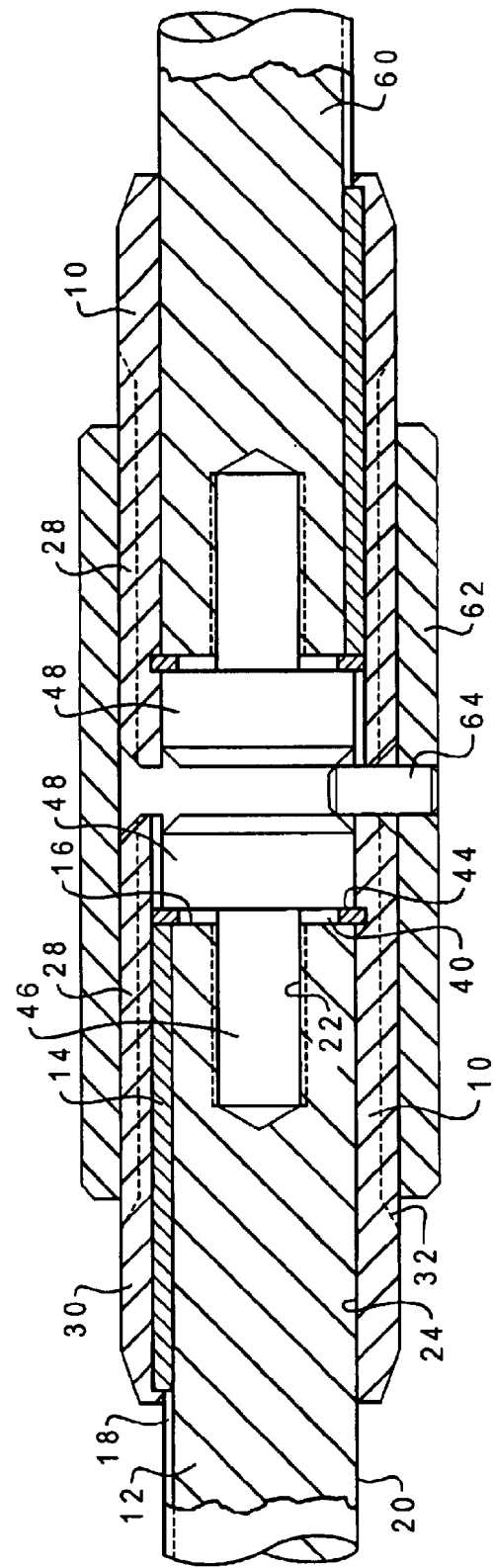
FIG. 5 is a sectional view of two shaft ends in accordance with claim 1 shown connected together.

FIG. 5 shows the upper end of shaft 12 of first pump 56 and the lower end of shaft 60 of second pump 58. Shaft sleeve 10 is shown installed on the upper end of shaft 12 of first pump 56, and a similar shaft sleeve 10 will be installed on the lower end of shaft 12 of first pump 56. The shaft of motor 52 will have a diameter that matches the outer diameter of shaft sleeve 10. Prior to installing shaft sleeve 10 with key 14 and fastener 46 on either the upper or lower end of shaft 12, the impellers and diffusers (not shown) of first pump 56 are slid over shaft 12. Shaft 60 of second pump 58 also has an enlarged diameter lower end created by installing a similar shaft sleeve 10. The upper end of shaft 60 does not need to be enlarged by a shaft sleeve 10 if it is driving only one pump 59 above it. If there are more pumps above pump 59, it might be feasible to provide a removable shaft sleeve 10 on the upper end of shaft 60.

A coupling sleeve 62 has internal splines that engage external splines 28 of shaft sleeve 10 on shaft 12 and external splines 28 of shaft sleeve 10 on shaft 60. Coupling sleeve 62 transmits torque from shaft sleeve 10 to shaft 60. Coupling sleeve 62 also has one or more buttons or pins 64 that extend inward from its sidewall that engage the two fastener heads 48. Pin 64 positions coupling sleeve 62 between the end assemblies of the two shafts 10 and 60. Tension is not transferred from shaft 12 to shaft 60 in this embodiment, however, down thrust on shaft 60 transmits to shaft 12. The load path is from shaft 60 through fastener head 48 secured thereto to pin 64 and from pin 64 through the fastener head 48 of shaft 12.

The invention has significant advantages. The shaft sleeve is readily removable to allow diffusers and impellers to be mounted on and removed from the shaft. The key provides for a full torque transmission up to the yield strength of the shaft. The shaft sleeve assembly also transmits axial thrust.

While the invention has been shown in only one of its forms, it should be apparent to those skilled in the art that it is not so limited, but is susceptible to various changes without departing from the scope of the invention.

What is claimed is:

1. A pump shaft assembly, comprising:
   a shaft having an end face and an outer diameter with a keyway slot;
   a shaft sleeve having an exterior splined section, a bore that receives the shaft, and a keyway slot in the bore that mates with the keyway slot of the shaft to form a keyway;
   a key located in the keyway for transmitting torque between the shaft and the shaft sleeve;
   an annular groove formed in the bore of the sleeve, the groove having axially spaced apart opposed walls;
   a retainer ring that snaps within the annular groove and is prevented from axial movement by the opposed walls of the groove;
   a threaded hole in the end face of the shaft; and
   a threaded fastener that secures in the threaded hole and has a head that forces the retainer ring against the end face to releasably secure the shaft sleeve axially to the shaft.

2. The shaft assembly according to claim 1, wherein the retainer ring engages a forward end of the key to prevent forward movement of the key; and
   the keyway slot in the shaft sleeve has a protuberance formed therein at a rearward end ot the shaft sleeve to prevent rearward movement of the key.

3. The shaft assembly according to claim 1, wherein:
   the head of the fastener has an outer diameter that is substantially the same as an outer diameter of the shaft and an end that protrudes at least to an end of the shaft sleeve.

4. The shaft assembly according to claim 1, wherein the shaft sleeve has a forward end that extends forward past the end face of the shaft, the shaft sleeve having a length that is greater than a length of the splined section, the splined section extending from the forward end rearwardly to a point that is forward of a rearward end of the shaft sleeve.

5. The shaft assembly according to claim 1, wherein the keyway slot of the shaft extends past the shaft sleeve in a rearward direction.

6. The shaft assembly according to claim 1, wherein the key has a tapered width section, the tapered width section being farther from the end face of the shaft than an opposite end of the key.

7. The shaft assembly according to claim 1, further comprising a coupling sleeve having internal splines that mate with the external splines of the shaft sleeve, the coupling sleeve extending past the end face of the shaft for coupling to splines of another shaft.

8. A submersible pump assembly having first and second components coupled together, each having a shaft and a connection between the shafts for transmitting torque, comprising:
   a shaft end on the shaft of the first component having an outer diameter with a keyway slot;
   a shaft sleeve having an exterior splined section, a bore that receives the shaft end, and a keyway slot in the bore that mates with the keyway slot of the shaft end to form a keyway, the splined section extending from a forward end of the shaft sleeve rearward to a point that is forward of a rearward end of the shaft sleeve;
   a key located in the keyway for transmitting torque between the shaft end and the shaft sleeve;
   the keyway slot on the shaft extending rearward past the rearward end of the shaft sleeve;
   a protruding member on the rearward end of the shaft sleeve to retain the key against rearward movement in the keyway;
   a threaded section operatively associated with the shaft sleeve and the shaft end to releasably secure the shaft sleeve axially to the shaft end; and
   a coupling sleeve having internal splines that engage the splined section of the shaft sleeve, the coupling sleeve being in engagement with a shaft end assembly of the second component for transmitting torque between the shafts of the first and second components.

9. The shaft assembly according to claim 8, further comprising:
   a thrust transmitting member extending radially inward from the internal splines of the coupling sleeve, relative to an axis of the coupling sleeve, to transmit thrust from the shaft of the first component through the coupling sleeve to the shaft sleeve.

10. A submersible pump assembly having first and second components that are coupled together, each having a shaft and a connection between each of the shafts for transmitting torque and axial loads, comprising:
    a shaft end on the shaft of the first component having an outer diameter with a keyway slot;
    a shaft sleeve having an exterior splined section, a bore that receives the shaft end, and a keyway slot in the bore that mates with the keyway slot of the shaft end to form a keyway, the shaft sleeve having a forward end that protrudes past an end face of the shaft and a rearward end, the keyway slot of the shaft end extending rearward past the rearward end of the shaft sleeve;
    an annular groove formed in the bore of the shaft sleeve, the groove having opposed forward and rearward facing walls;
    a retainer ring that snaps into the groove and is retained against axial movement by the walls of the groove;
    a key located in the keyway for transmitting torque between the shaft end and the shaft sleeve;
    a threaded hole extending inward from the end face of the shaft end coaxial with an axis of the shaft end;
    a threaded fastener that secures to the threaded hole and has a head that engages the retainer ring and forces the retainer ring against the end face of the shaft end to releasably secure the shaft sleeve to the shaft end;
    a coupling sleeve having internal splines that slidingly engage the external splined section of the shaft sleeve, the coupling sleeve being in engagement with a shaft end assembly of the second component for transmitting torque between the shafts of the first and second components; and a thrust transmitting member extending radially inward from the coupling sleeve forward of the forward end of the shaft sleeve and in contact with a forward side of the head of the fastener for transmitting axial loads between the shafts of the first and second components.

11. The submersible pump assembly according to claim 10, wherein the thrust transmitting member comprises a pin extending through a side wall of the coupling sleeve.

12. The submersible pump assembly according to claim 10, wherein the wherein the shaft sleeve has a length that is substantially greater than a length of the splined section, the splined section extending from the forward end of the shaft sleeve to a point forward of the rearward end of the shaft sleeve.

13. The submersible pump assembly according to claim 10, further comprising a protruding member in the keyway slot of the shaft sleeve at the rearward end of the shaft sleeve to prevent rearward movement of the key.

14. A submersible pump assembly having first and second components that are coupled together, comprising:

a first shaft in the first component having a first shaft end with an outer diameter and a keyway slot;

a first shaft sleeve having an exterior splined section, a bore that receives the first shaft end, and a keyway slot in the bore that mates with the keyway slot of the first shaft end to form a first keyway;

a first key located in the keyway for transmitting torque between the first shaft end and the first shaft sleeve;

a first threaded section operatively associated with the first shaft sleeve and the first shaft end to releasably secure the first shaft sleeve axially to the first shaft end;

a second shaft in the second component having a second shaft end spaced axially from the first shaft end;

a second shaft sleeve having an exterior splined section, a bore that receives the second shaft end, and a keyway slot in the bore that mates with the keyway slot of the second shaft end to form a second keyway;

a second key located in the second keyway for transmitting torque between the second shaft end and the second shaft sleeve;

a second threaded section operatively associated with the second shaft sleeve and the second shaft end to releasably secure the second shaft sleeve axially to the second shaft end;

a coupling sleeve having internal splines that slidingly engage the exterior splined sections of the first and second shaft sleeves for transmitting torque between the first and second shafts; and a thrust transmitting member extending radially inward from the coupling sleeve between the first and second shaft sleeves for transmitting axial loads from the first shaft sleeve to the second shaft sleeve.

* * * * *

UNITED STATES PATENT AND TRADEMARK OFFICE
CERTIFICATE OF CORRECTION

PATENT NO. : 6,752,560 B2
DATED : June 22, 2004
INVENTOR(S) : Brown Lyle Wilson et al.

It is certified that error appears in the above-identified patent and that said Letters Patent is hereby corrected as shown below:

Column 1,
Line 24, delete "ration" and insert -- ratio --

Column 7,
Line 14, delete "wherein the" after "10,"

Signed and Sealed this

Twenty-eighth Day of September, 2004

JON W. DUDAS
*Director of the United States Patent and Trademark Office*